No. 687,068. Patented Nov. 19, 1901.
S. P. RODABAUGH & W. B. ALBERTSON.
THILL COUPLING.
(Application filed Apr. 11, 1901.)
(No Model.)
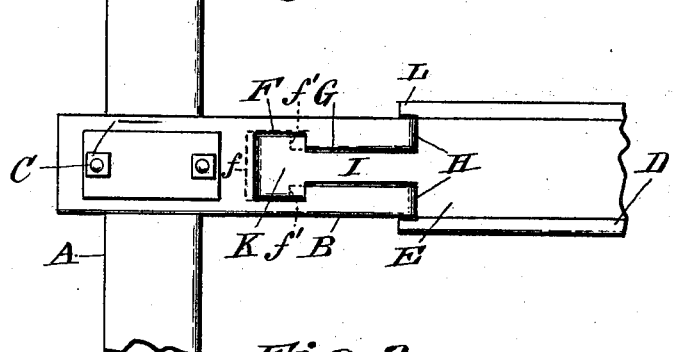
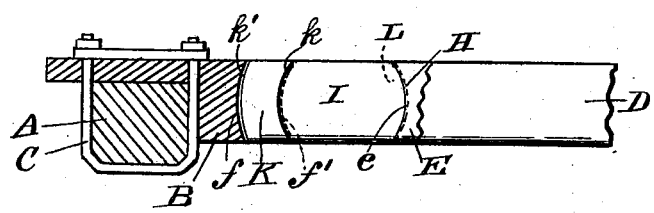
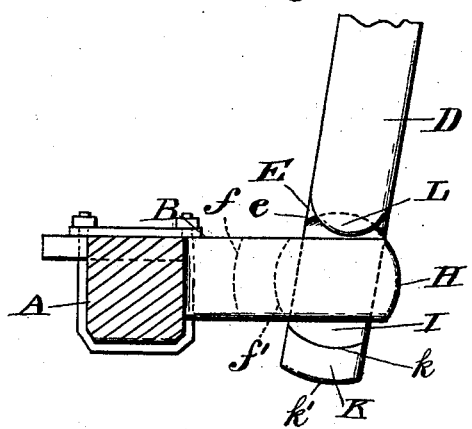
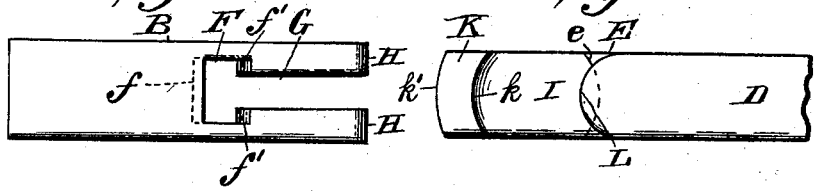
Witnesses
Inventors
Samuel P. Rodabaugh
William B. Albertson
Attorney

UNITED STATES PATENT OFFICE.

SAMUEL P. RODABAUGH AND WILLIAM B. ALBERTSON, OF BETHANY, NEBRASKA.

THILL-COUPLING.

SPECIFICATION forming part of Letters Patent No. 687,068, dated November 19, 1901.

Application filed April 11, 1901. Serial No. 55,407. (No model.)

*To all whom it may concern:*

Be it known that we, SAMUEL P. RODABAUGH and WILLIAM B. ALBERTSON, residents of Bethany, in the county of Lancaster and State of Nebraska, have invented certain new and useful Improvements in Thill-Couplings, of which the following is a specification.

Our invention relates to thill-couplings for vehicles, and has for its object to provide an effective means of coupling the shafts or pole to the front axle of a wagon or carriage that is simple in operation and reasonable in cost of manufacture. We attain this object by the mechanism illustrated in the accompanying drawings, in which—

Figure 1 is a plan view of a position of the axle of a vehicle and of a thill sufficient to illustrate our invention; Fig. 2, a section in elevation of the same parts; Fig. 3, a view in elevation showing the shaft raised to a position to uncouple it; Fig. 4, a plan view of the part attached to the axle; Fig. 5, an elevation of the part attached to the shaft.

Similar letters of reference denote like parts throughout the several views.

The axle of the wagon A has attached to it a bracket B by the clip C. The bracket B comprises one member of our thill-coupling. The shaft D has fixed to it the other member E of our thill-coupling by any suitable means.

F represents an orifice in the bracket B, having a slot G, with parallel walls extending forward to the front of said bracket. The wall $f$ of the orifice F is curved toward the axle A, while the walls $f'$ adjacent to the slot G are curved parallel to the wall $f$. The front faces H of the bracket B are also curved, so that the front and back ends of the slot G form segments of the same circle, while the wall $f$ of the orifice F forms a segment of a concentric circle.

The part E of the coupling is formed with a bar I in the center thereof, the sides of said bar being parallel and having an enlarged head K on the end thereof. The faces $e$ of the part E adjacent to the bar I are curved inward, while the faces $k$ of the head K next to the said bar are also curved inward, the two curved surfaces $e$ and $k$ being segments of the same circle. The end $k'$ of the head K is curved, forming a segment of a circle, concentric with the circle of which the curved surfaces $e$ and $k$ are segments. The bar I is slightly longer and thinner than the slot G, while the head K is slightly smaller than the orifice F, so that when the thill-coupling is perfected these parts fit each other easily.

L represents ears on the sides of the part E.

The operation is as follows: The shafts being disconnected from the axle, to couple them raise the shafts to the position shown in Fig. 3, which is nearly perpendicular, so that the bar I slides into the slot G until the faces $e$ and H and $f'$ and $k$ are adjacent to each other. The shaft is then lowered. The head K enters the orifice F. The two ends of the bracket bear against the faces $e$ of the part E, and the coupling is complete. To uncouple, again raise the shafts to the position shown in Fig. 3, and the part E and bracket B can be disengaged.

We do not wish to be limited to the exact construction hereinabove described and disclosed in the drawings, as the same may be altered somewhat without departing from the spirit of our invention.

Having thus described our invention, what we claim is—

1. In a thill-coupling, a bracket with a longitudinal slot and an orifice at the end of said slot, the walls of said slot and each wall of said orifice being parallel to the wall opposite thereto, and a member with a bar and head on the end thereof, each side of which is parallel to the opposite side thereof, to fit into said slot and orifice, substantially as shown and described.

2. In a thill-coupling, a bracket attached to the axle of a vehicle, a longitudinal slot in said bracket having parallel walls, an orifice at the end of said slot, each of the walls of said orifice being parallel with the wall opposite thereto, a member attached to the shafts comprising a bar with parallel sides, an enlarged head thereon, the opposite sides of which are parallel, and means for retaining said parts in engagement, substantially as shown and described.

3. In a thill-coupling, a bracket adapted to be attached to the axle of a vehicle, an orifice therein having perpendicular walls and parallel curved walls, said curved walls being segments of concentric circles, the end of said bracket curved forming a segment of the same circle of which the nearest wall of the orifice is a segment, a slot connecting said orifice and the front of said bracket, a part attached to the shafts adapted to fit into said bracket, substantially as shown and described.

4. In a thill-coupling, a part attached to the shafts having a bar with an enlarged head and parallel walls, the part affixed to the shaft adjacent to the bar being concave, and the part of said enlarged head adjacent to said bar being concave, said concave surfaces forming segments of the same circle, the outer end of said head being curved forming a segment of a circle concentric with the other of said curved parts, and a bracket formed to receive said bar and head, substantially as shown and described.

5. In a thill-coupling, a bracket adapted to be attached to the axle of a vehicle, a slot therein having parallel walls, an orifice at the inner end of said slot, perpendicular walls in said orifice, the walls of the orifice adjacent to said slot convex, and opposite thereto concave, the end of the bracket convex, the walls of said orifice and the end of said bracket being segments of the same and of concentric circles, a member attached to the shafts having a bar and a head adapted to fit into said slot and orifice, the surfaces bearing on the curved surfaces of the bracket being curved to fit said curved surfaces, substantially as shown and described.

6. In a thill-coupling, a bracket, the top and bottom thereof parallel, a slot at right angles to said top and bottom, parallel walls in said slot, an orifice at the inner extremity of said slot, the walls of said orifice abutting said slot and opposite thereto curved and parallel, the side walls of said orifice at right angles to the top and bottom, the front end of the bracket curved and a segment of the same circle of which the nearest wall of said orifice is a segment, a part attached to the shafts comprising a bar and head of equal height with the bracket aforesaid, each side of said bar parallel to the side opposite thereto, an enlarged head on the end of said bar, the height thereof the same as said bracket, the surfaces of the part next the shafts and of the head abutting said bar being segments of the same circle and the end of the head opposite the surfaces abutting the bar parallel to said abutting surfaces, the other sides of said head flat and parallel to the opposite sides thereof, said bar and head shaped to fit the slot and orifice in said bracket and the curved surface nearest the shafts shaped to fit the end of the bracket, substantially as shown and described.

In testimony whereof we hereto affix our signatures in the presence of two witnesses.

SAMUEL P. RODABAUGH.
WILLIAM B. ALBERTSON.

Witnesses:
   JNO. W. MCGERE,
   MARY E. MCGERE.